United States Patent Office 3,309,174
Patented Mar. 14, 1967

3,309,174
ALKALI METAL TRIPOLYPHOSPHATE PRODUCT
Raimond Pals, Farmingdale, N.J., assignor to FMC Corporation, New York, N.Y., a corporation of Delaware
No Drawing. Filed Nov. 29, 1962, Ser. No. 241,059
6 Claims. (Cl. 23—107)

This invention relates to potassium tripolyphosphate and sodium tripolyphosphate, and more particularly to a method of increasing the assay of these tripolyphosphate products.

Sodium tripolyphosphate ($Na_5P_3O_{10}$) and potassium tripolyphosphate ($K_5P_3O_{10}$) are presently employed as the principal cleaning aids in detergent mixtures. One method for producing such an alkali metal tripolyphosphate product is to react phosphoric acid and an alkaline compound such as sodium hydroxide or sodium carbonate together in an aqueous solution such that the mole ratio of sodium to phosphorus is on the order of about 1.67. This reaction results in the formation of an aqueous mixture containing monosodium orthophosphate and disodium orthophosphate in a mole ratio of 1:2. The free water is removed from the above phosphate solution by passing the liquid into a heating zone where it is progressively heated to a temperature of about 350° C. or higher, during which sodium tripolyphosphate is formed. The ultimate reaction takes place in accordance with the following equation.

$$NaH_2PO_4 + 2Na_2HPO_4 \rightarrow Na_5P_3O_{10} + 2H_2O$$

In the case of sodium tripolyphosphate, this product is recovered in either of two forms—Form I which is produced at temperatures of about 500° to 620° C. or Form II which is produced at temperatures below about 500° C. Mixtures of Form I and Form II are commonly obtained as a product to suit the needs of the detergent manufacturers. The product thus obtained from the heating zone is cooled, milled, and bagged for shipment. The potassium salt is produced in a like manner except that no separate forms exist as they do in the case of the sodium salt.

A most serious problem that has arisen in the above process is the relatively low assay of the alkali metal tripolyphosphate that is obtained in the product; in the case of the sodium salt, this varies from about 85% to 91% sodium tripolyphosphate with the remainder being present as sodium trimetaphosphate ($Na_3P_3O_9$) or tetrasodium pyrophosphate ($Na_4P_2O_7$). It has not been found possible thus far to upgrade the assay of the alkali metal tripolyphosphate product, even though higher assays are desirable in the trade. For example, heating the product to higher temperatures than were used in manufacture or heating the product for extended periods of time does not materially affect the assay.

It is an object of the present invention to increase the assay of an alkali metal tripolyphosphate product produced by heating mixtures of monosodium orthophosphate and disodium orthophosphate, or the equivalent potassium salts.

It is a further object to increase the assay of the alkali metal tripolyphosphate product without regrinding or changing the bulk density of the tripolyphosphate product, and to obtain a final product having identical physical characteristics as the precursor tripolyphosphate product except that it has a substantially increased alkali metal tripolyphosphate assay.

A method has now been found for increasing the assay of either sodium or potassium tripolyphosphate product (normally containing at least about 85% tripolyphosphate), obtained by heating a mixture of the monometal orthophosphate ($MH_2PO_4$) and dimetal orthophosphate ($M_2HPO_4$), which comprises heating the tripolyphosphate product in an atmosphere containing water vapor in an amount sufficient to yield a partial pressure above about 50 mm. (and preferably 100 mm. to 760 mm.) at a temperature of from about 350° C. to about 550° C. (and preferably at 400° C. to 500° C.) for a period of from about 45 to about 180 minutes.

It is quite unexpected that the assay of the alkali metal tripolyphosphate product can be increased by this after-treatment since more heating of the alkali metal tripolyphosphate in the final heating stage does not effect this result. The presence of water-vapor in the heating atmosphere is critical in obtaining the increase in assay. While the exact reason for this increase in assay is not known, it is believed due to a more complete conversion of the phosphates to tripolyphosphate under the after-treatment conditions.

In carrying out the present invention with a sodium tripolyphosphate product, which is to be upgraded, it may be treated in any convenient heating equipment such as a rotary drier, a fluid bed, or gravity flow column. The gravity flow column is operated by feeding the sodium tripolyphosphate continuously into the top of the column while constantly passing a water vapor-containing atmosphere upward through the column. The sodium tripolyphosphate and water vapor are in continuous counter-current contact throughout the residence of the sodium tripolyphosphate in the column. The column is heated to the desired temperature and the sodium tripolyphosphate is passed through the column at a rate sufficient to satisfy the required residence time. The final product, having an increased assay, is removed from the base of the column.

Operation of the gravity flow columns at temperatures of from 400° to 500° C. have been found preferable, but temperatures of from 350° to 550° C. have been found effective. The duration of the heat treatment is determined by the length of the column and the rate at which the sodium tripolyphosphate is passed through the column. Treating periods of as little as 45 minutes in the gravity flow column and in some cases as low as 30 minutes, can be employed to increase the assay. The desired increase in assay of the sodium tripolyphosphate has been found to occur in atmospheres containing only 27 mm. of water vapor. This is unusual since higher amounts of water are generally required with fluid bed columns and rotary kilns to achieve assay increases.

When the present process is carried out in a fluid bed column, the sodium tripolyphosphate is suspended in the bed by a current of heated fluidizing air which passes upward through the bed. The atmosphere in the fluid bed is controlled by regulating the amount of water vapor introduced into the upward flowing fluidizing gas. The bed can be heated by means of an external heater surrounding the fluid bed and/or by preheating the fluidizing gas.

Where a rotary kiln is employed as the heating equipment for carrying out the present process, the sodium tripolyphosphate product is fed into one end of a heated rotating kiln and removed from the opposite end. During its passage through the kiln, the sodium tripolyphosphate product is heated to the required temperatures and the kiln atmosphere is controlled by regulating the amount of water vapor which is introduced into the air stream entering the kiln. Heating of the kiln can be carried out by internal firing or external heating of the kiln walls.

When employing either fluid bed columns or rotary kilns for carrying out the present process, the water vapor content of the atmosphere must be on the order of about 50 mm. or above, with 100 mm. or above being preferred. Water vapor contents up to 760 mm. are preferred for ease of operation because no pressure equipment is required. Use of water vapor contents above 760 mm. will yield the desired increase in assay, but necessitates using heating equipment which will operate at super-atmospheric pressures, and thus is economically undesirable.

The temperatures employed in carrying out the present process using either fluid beds or rotary kilns may vary from about 350 to 550° C. but temperatures of from about 400° C. to about 500° C. are preferred.

In carrying out the present process, using a sodium tripolyphosphate product, the feed material may be in either powder or granular form. The largest increase in assay is obtained when the product is in powder form, particularly −100 mesh. Granular sodium tripolyphosphate (+100 mesh) shows an improvement in assay when treated by the present process, but powdered −100 mesh tripolyphosphate shows an increase which is twice that obtained with granular sodium tripolyphosphate.

The present process for increasing assay is not a part of the manufacturing process for producing the tripolyphosphate product per se. It is intended as an after-treatment step in equipment where the temperature and water vapor content of the atmosphere in the heating equipment can be carefully controlled. The increase in assay which results raises the assay as high as seven percentage points; thus, a 90% assay sodium tripolyphosphate can be readily increased to a 97% assay sodium tripolyphosphate by this process. While this would appear to be a very small numerical increase in the assay, it represents a conversion of 70% of the non-sodium tripolyphosphate values existing in the product to sodium tripolyphosphate. Thus the process reduces the non-tripolyphosphate values of the product by 70%. This results in recovering sizable amounts of sodium tripolyphosphate because of the large quantity of sodium tripolyphosphate product which is produced for consumption in the detergent industry.

Since the present process heats sodium tripolyphosphate to temperatures where conversion from Form II to Form I can take place, it is advisable to select a temperature at which the desired form is obtained. The exact temperature of change in form depends upon the amount of water vapor in the atmosphere of the treating equipment, the mesh size of the sodium tripolyphosphate being treated, and the temperature of treatment.

The alkali metal tripolyphosphate product which is recovered does not have an appreciable different water content than the precursor tripolyphosphate feed. In the present process the tripolyphosphate feed is not water soaked or in any way sprayed with water to effect the increase in assay. The increase is obtained by merely controlling the water vapor content of the atmosphere in contact with the tripolyphosphate product during the heating operation.

While this treatment has been found particularly suitable in treating sodium tripolyphosphate, the potassium tripolyphosphate, which is produced in a similar fashion, can be treated in a like fashion. Upgrading the assay of the potassium salt by this process is achieved under the same treating conditions as the sodium salt. However, the increase in assay is somewhat lower with the potassium salt than with the sodium salt.

The following examples are given to illustrate the present invention but are not deemed to be limitative thereof.

*Example 1*

Sodium tripolyphosphate was prepared by the following typical commercial process. Soda ash and phosphoric acid were added to water in sufficient quantity so that the final solution had a molar ratio of Na/P of about 1.67/1 and density of 55° Baumé. The heat of reaction was sufficient to increase the temperature of the solution to about 100° C. and drive off most of the carbon dioxide. The resulting solution was fed to a drier to remove the free water, and the dry orthophosphates further heated by exposure to hot gases until the temperature of the product was about 500° C. The product was then cooled, reduced in size, and conveyed to a storage bin. The product was found to vary in assay from about 87 to 92% sodium tripolyphosphate content with the remainder comprising mostly sodium pyrophosphate and sodium metaphosphate.

*Example 2*

Sodium tripolyphosphate prepared as described in Example 1 was ground to a particle size range such that all of the material passed through a U.S. Standard No. 16 sieve with about 60% being retained on a U.S. No. 100 sieve and 40% passing through the No. 100 sieve. A series of runs were made in which approximately 1200 grams of this product was fed into a fluidized solids column about 3 inches in diameter and 7 feet high, having a conical bottom. Heated air was passed up through the column at a velocity sufficient to maintain the particles in a fluidized state. The temperature of the air was adjusted to reach the desired product temperature for each run (between about 350 and 510° C.). Steam was metered into the air stream at a predesigned rate necessary to maintain the desired water vapor pressure for each run (between about 100 and 350 mm. Hg). After treatment for the desired period of time, the product or a sample was removed from the apparatus, cooled, and analyzed to determine the effects of the treatment. The exact mesh size, temperature, water vapor pressure and treating time employed for each run are listed in Table I, along with the product assays.

*Example 3*

Sodium tripolyphosphate prepared as described in Example 1 was ground to a particle size range such that all of the material passed through a U.S. Standard No. 8 sieve, with about one-third passing through a No. 20 but retained on a No. 100 sieve, and one third passing through the No. 100 sieve. A series of runs were made in which this product was heated to the desired temperature (between 400° and 505° C.) and then fed through a funnel shaped feeder into the top of a 6-inch diameter by 12-inch high column. The material in the column was maintained at the desired temperature by means of electrical wall heaters. Steam, or humid air, was introduced through a nozzle in the bottom of the column to maintain the desired water vapor pressure within the column. The product was discharged through a valve in the bottom cone at the same rate as it was introduced in the top of the column, keeping the column filled with about 12 pounds of material throughout the run. The residence time of the material inside the column was controlled by the rate at which the material was introduced into the top of the column and withdrawn from the bottom. Samples taken from the bottom discharge of the column were cooled and analyzed to determine the effects of the treatment. The exact mesh size, temperature, water vapor pressure, and treating time utilized for each run is reported in Table II along with the product assays.

*Example 4*

A series of runs were made using sodium tripolyphosphate prepared as described in Example 1 and ground to a particle size range as described in Example 3. About 30 pounds of sodium tripolyphosphate was used for each run and loaded into an externally heated rotary drier about 12 inches in diameter by 24 inches long. The drier was rotated at 12 to 24 r.p.m. to tumble the material while heat was applied to the drier shell with four burners. Humid air, heated to 200 to 300° C., with the water vapor pressure controlled to the desired value (between 50 and 355 mm. Hg.) was passed into the drier through a pipe inserted in a hollow supporting shaft. The material was heated to the desired temperature by controlling the burners and after a specified time the product was removed, cooled, and analyzed to determine the effects of the treatment. The exact mesh size, temperature, water vapor pressure and treating time utilized for each run is reported in Table III along with the product assays.

Example 5

Potassium tripolyphosphate was prepared by the following typical commercial process. Potassium hydroxide and phosphoric acid were added to water in sufficient quantities so that the final solution had a molar ratio of K/P of about 1.67/1 and a density of about 55° Baumé.

The heat of reaction was sufficient to increase the temperature of the solution of about 100° C. The resulting solution was fed to a drier to remove the free water and dry orthophosphate further heated by exposure to hot gases until the temperature of the product was about 500° C. The product was then cooled, reduced in size, and conveyed to a storage bin. The product was found to vary in assay from about 85 to 90% potassium tripolyphosphate with the remainder comprising mostly potassium pyrophosphate and potassium metaphosphate. A sample of about 30 pounds of the potassium tripolyphosphate product was treated in the manner described in Example 4. The exact mesh size, temperature, water vapor pressure and treating time utilized is reported in Table 3, Run 9.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

TABLE I

| Run No. | Mesh Size | Water Vapor (mm. Hg) | Temperature (° C.) | Time (min.) | Assay Initial | Assay After Treatment | Increase |
|---|---|---|---|---|---|---|---|
| 1 | +100 | 250–300 | 435 | 90 | 88.7 | 91.8 | 3.1 |
| 2 | −100 | 250–300 | 435 | 90 | 90.9 | 95.8 | 4.9 |
| 3 | −100 | 250–300 | 500 | 55 | 88.8 | 96.3 | 7.5 |
| 4 | +100 | 100–150 | 490 | 60 | 86.2 | 89.3 | 3.1 |
| 5 | −100 | 100–150 | 490 | 60 | 87.8 | 93.0 | 5.2 |
| 6 | −100 | 100–150 | 495 | 120 | 87.8 | 96.4 | 8.6 |
| 7 | −100 | 100–150 | 506 | 50 | 88.8 | 96.0 | 7.2 |

TABLE II

| Run No. | Mesh Size | Water Vapor (mm. Hg) | Temperature (° C.) | Time (min.) | Assay Initial | Assay After Treatment | Increase |
|---|---|---|---|---|---|---|---|
| 1 | +100 | 567 | 485 | 58 | 89.3 | 92.0 | 2.7 |
| 2 | −100 | 567 | 485 | 58 | 91.9 | 96.9 | 5.0 |
| 3 | −100 | 567 | 485 | 60 | 90.9 | 97.4 | 6.5 |
| 4 | −100 | 567 | 491 | 66 | 90.9 | 97.5 | 6.6 |
| 5 | +100 | 567 | 480 | 70 | 88.7 | 91.8 | 3.1 |
| 6 | −100 | 567 | 480 | 70 | 90.9 | 97.3 | 6.4 |
| 7 | −100 | 355 | 450 | 50 | 89.0 | 94.6 | 5.6 |
| 8 | −100 | 355 | 482 | 65 | 89.0 | 94.7 | 5.7 |
| 9 | +100 | 200 | 495 | 80 | 87.5 | 92.7 | 4.2 |
| 10 | −100 | 200 | 495 | 80 | 88.8 | 95.7 | 6.9 |
| 11 | −100 | 100 | 500 | 70 | 90.0 | 96.3 | 6.3 |
| 12 | −100 | 50 | 484 | 91 | 90.0 | 95.2 | 5.2 |

TABLE III

| Run No. | Mesh Size | Water Vapor (mm. Hg) | Temperature (° C.) | Time (min.) | Assay Initial | Assay After Treatment | Increase |
|---|---|---|---|---|---|---|---|
| 1 | +100 | 760 | 460 | 60 | 90.0 | 95.1 | 5.1 |
| 2 | +100 | 355 | 400 | 120 | 89.9 | 94.5 | 4.6 |
| 3 | +100 | 200 | 490 | 60 | 89.9 | 95.4 | 5.5 |
| 4 | +100 | 27 | 410 | 120 | 89.9 | 93.9 | 3.0 |
| 5 | −100 | 634 | 455 | 120 | 90.8 | 97.4 | 7.8 |
| 6 | −100 | 526 | 440 | 120 | 89.5 | 97.0 | 7.5 |
| 7 | −100 | 355 | 400 | 120 | 91.1 | 97.9 | 6.8 |
| 8 | −100 | 200 | 400 | 120 | 91.1 | 98.0 | 6.9 |
| 9 [1] | +100 | 760 | 430 | 60 | 87.1 | 92.6 | 5.5 |

[1] Potassium tripolyphosphate treated in this run instead of sodium tripolyphosphate.

What is claimed is:

1. A method for increasing the assay of an alkali metal tripolyphosphate, selected from the group consisting of sodium tripolyphosphate and potassium tripolyphosphate in a product mixture containing at least about 85% of said alkali metal tripolyphosphate, produced by heating a mixture of the corresponding alkali metal salts of monohydrogen orthophosphate and dihydrogen orthophosphate which comprises heating said product mixture in an atmosphere containing water vapor in an amount sufficient to yield a partical pressure of at least about 50 mm. of mercury, at a temperature of from about 350° to about 550° C. for a period of from about 30 to about 180 minutes.

2. A method for increasing the assay of $Na_5P_3O_{10}$ in a product mixture containing at least about 85% of the $Na_5P_3O_{10}$ obtained by heating a mixture of $NaH_2PO_4$ and $Na_2HPO_4$ which comprises heating said product mixture in an atmosphere containing water vapor in an amount sufficient to yield a partial pressure of at least about 50 mm. of mercury, at a temperature of from about 400° to about 550° C. for a period of from about 30 to about 180 minutes.

3. Method of claim 1 in which said tripolyphosphate is potassium tripolyphosphate.

4. Method of claim 1 in which the water vapor has a vapor pressure of about 27 mm.

5. Method of claim 1 in which the water vapor has a partial pressure of from about 100 mm. to 760 mm.

6. Process of claim 1 in which the temperature is from about 400° to about 500° C.

References Cited by the Examiner

UNITED STATES PATENTS 2,898,189 8/1959 Rodis et al. ---------- 23—106
3,030,180 4/1962 Bigot ---------------- 23—106

OTHER REFERENCES

Van Wazer: "Phosphorus and Its Compounds" volume 1, page 647, Interscience Publishers, Inc., New York, N.Y. 1958.

OSCAR R. VERTIZ, *Primary Examiner.*

O. F. CRUTCHFIELD, *Assistant Examiner.*